United States Patent
Kanda

(10) Patent No.: US 10,634,552 B2
(45) Date of Patent: Apr. 28, 2020

(54) VIBRATION SENSING OPTICAL FIBER SENSOR AND VIBRATION SENSING METHOD

(71) Applicant: Oki Electric Industry Co., Ltd., Tokyo (JP)

(72) Inventor: Yoshihiro Kanda, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 213 days.

(21) Appl. No.: 15/870,842

(22) Filed: Jan. 12, 2018

(65) Prior Publication Data

US 2018/0283935 A1 Oct. 4, 2018

(30) Foreign Application Priority Data

Mar. 28, 2017 (JP) ................. 2017-062205

(51) Int. Cl.
G01J 4/04 (2006.01)
G01H 9/00 (2006.01)

(52) U.S. Cl.
CPC ............... *G01H 9/004* (2013.01); *G01J 4/04* (2013.01)

(58) Field of Classification Search
CPC .................................. G01H 9/004; G01J 4/04
USPC .......................................................... 73/655
See application file for complete search history.

(56) References Cited

U.S. PATENT DOCUMENTS

| | | | | |
|---|---|---|---|---|
| 7,992,440 B2* | 8/2011 | Kumagai | ............... | G01H 9/004 356/460 |
| 2002/0186468 A1* | 12/2002 | Lee | ............. | G02B 6/2746 359/484.03 |
| 2008/0225274 A1* | 9/2008 | Hirata | ............. | G01H 9/00 356/73 |
| 2009/0141267 A1* | 6/2009 | Hotate | ............. | G01M 11/088 356/73.1 |
| 2009/0207409 A1* | 8/2009 | Yao | ............. | G01J 3/1895 356/365 |

(Continued)

FOREIGN PATENT DOCUMENTS

| | | | |
|---|---|---|---|
| CN | 108548939 | * | 9/2018 |
| JP | 2008-203239 A | | 9/2008 |
| WO | WO2011148634 | * | 12/2011 |

OTHER PUBLICATIONS

Z. Zhang and X. Bao, "Distributed optical fiber vibration sensor based on spectrum analysis of polarization-OTDR", Optics Express, vol. 16, No. 14, Jul. 7, 2008, pp. 10240-10247.

(Continued)

*Primary Examiner* — Jacques M Saint Surin
(74) *Attorney, Agent, or Firm* — Rabin & Berdo, P.C.

(57) ABSTRACT

A vibration sensing optical fiber sensor is structured to include a probe light supplying section, an optical fiber, a polarimeter for reflected light, and a computing unit. The probe light supplying section generates, as probe light, light pulses that are switched alternately and periodically to orthogonal polarization directions. The probe light is inputted to the optical fiber. The polarimeter for reflected light measures a state of polarization of reflected light that is the probe light that has been reflected by the optical fiber. The computing unit carries out specifying of a position of vibrations by using the differential angular velocity from the state of polarization measured by the polarimeter for reflected light.

10 Claims, 2 Drawing Sheets

(56) References Cited

U.S. PATENT DOCUMENTS

| | | | |
|---|---|---|---|
| 2010/0225900 A1* | 9/2010 | Hotate | G01M 11/3181 356/73.1 |
| 2011/0228255 A1* | 9/2011 | Li | G01B 11/18 356/33 |
| 2016/0377660 A1* | 12/2016 | Muller | G01R 15/247 324/96 |
| 2018/0058886 A1* | 3/2018 | Kanda | G01D 5/344 |

OTHER PUBLICATIONS

Y. Kanda and H. Murai, "Novel extraction method of the maximum variation-rate of State-of-Polarization vector from time-varying birefringence," OFC2016, W2A.21, Mar. 20-24, 2016, pp. 1-3.
R. M. Jopson, L. E. Nelson, and H. Kogelnik, "Measurement of Second-Order Polarization-Mode Dispersion Vectors in Optical Fibers," IEEE Photonics Technology Letters, vol. 11, No. 9, Sep. 1999, pp. 1153-1155.

* cited by examiner

VIBRATION SENSING OPTICAL FIBER SENSOR AND VIBRATION SENSING METHOD

CROSS-REFERENCE TO RELATED APPLICATION

This application is based on and claims priority under 35 USC 119 from Japanese Patent Application No. 2017-062205 filed on Mar. 28, 2017, which is incorporated by reference herein.

BACKGROUND

Technical Field

The present disclosure relates to a vibration sensing optical fiber sensor and a vibration sensing method that observe fluctuations over time in the birefringence of an optical fiber, and sense vibrations applied to the optical fiber from the exterior, and specify the position of the vibrations.

Related Art

It is extremely important for large-scale facilities, such as power plants and factories and the like, to be able to sense the trespassing of persons. Therefore, sensors, which are provided at a fence at the outer periphery of a facility or the like and which sense trespassing, have an important role.

In particular, trespassing sensing sensors that utilize the low-loss property of optical fibers are utilized as trespassing sensing sensors for distances such as the length of the outer periphery exceeding 1 km.

When vibrations are inputted to an optical fiber from the exterior, the polarized state of the light waves outputted from the optical fiber varies over time. The reason for this is the variations over time in the birefringence (the intrinsic axis of birefringence and the phase difference between orthogonal polarization axes that is generated by the birefringence) of the optical fiber that accompany vibrations, and as a result thereof, variations over time in the state of polarization (SOP) of the outputted light waves are observed. Vibrations of a fence or the like can be sensed if an optical fiber is affixed to the fence or the like, and probe light is inputted to the optical fiber, and variations over time in the state of polarization of the outputted probe light are observed (refer to, for example, Japanese Patent Application Laid-Open (JP-A) No. 2008-203239 (Patent Document 1)).

There are mainly two important functions of a vibration sensing optical fiber sensor that is used as a trespassing sensing sensor. One is to reduce erroneous sensing due to vibrations transmitted to the optical fiber due to factors other than trespassing such as wind or the like. Another is to specify the position at the which the act of trespassing has occurred.

In the method disclosed in Patent Document 1, an optical fiber is set in the form of a loop at a fence that is at the outer periphery of a facility, and probe light is inputted, to the optical fiber that is disposed in the form of a loop, so as to propagate counterclockwise and clockwise. Then, the rate of variations over time in the states of polarization of the probe light that propagates counterclockwise and the probe light that propagates clockwise is determined. Here, the rate of variations over time in the state of polarization means the rotation rate of the Stokes vector that expresses the state of polarization of the light waves.

Because the light waves that are inputted to the optical fiber require a time of approximately 5 ns in order to propagate 1 m, a difference arises in the start times of the variations over time in the states of polarization of the counterclockwise and clockwise propagating lights. Therefore, the position of the vibrations can be specified on the basis of the start times of the variations over time in the states of polarization.

There are also optical fiber sensors that utilize Polarization Optical Time Domain Reflectometry (POTDR) (refer to, for example, Z. Zhang and X. Bao, "Distributed optical fiber vibration sensor based on spectrum analysis of polarization-OTDR", Optics Express, Vol. 16, No. 14, pp. 10240-10247 (Non-Patent Document 1)). This is optical time domain reflectometry (OTDR) that utilizes the state of polarization. When light pulses are inputted to an optical fiber, reflected light, which accompanies the time delay needed for the propagation of the light pulses, is observed at the input ends of the light pulses.

When vibrations are applied to an optical fiber, the birefringence of the optical fiber varies. The state of polarization of the reflected light depends on the birefringence. Therefore, by observing variations over time in the reflected light via a polarizer, the position at which the light pulses are affected by vibrations of the optical fiber can be specified.

All of the above-described methods are methods that sense stress variations that are due to vibrations or the like, by variations over time in the state of polarization of light waves outputted from an optical fiber. However, variations over time in the state of polarization of the light waves outputted from an optical fiber depend both on the direction of the intrinsic axis of the birefringence of the optical fiber that varies in accordance with vibrations, and on the state of polarization of the propagated light that is incident on the vibration point. Generally, the state of polarization of light waves that propagate through an optical fiber is random, and the variations over time in the birefringence of the optical fiber also depend on the way in which vibrations are applied to the optical fiber. For example, in a case in which light waves are inputted so as to couple at the intrinsic axis relating to the birefringence of the optical fiber, the state of polarization of the outputted light waves does not vary.

Because of the above-described dependencies, if only variations over time in the state of polarization are observed, the same results cannot be obtained even for the same vibrations. Accordingly, merely observing variations over time in the state of polarization of the outputted light waves leads to the overlooking of abnormal vibrations that are objects of sensing, or to erroneous sensing. Further, the accuracy of specifying the position of the vibrations also deteriorates.

The present disclosure was made in view of the above-described problematic points.

SUMMARY

An object of the present disclosure is to provide a vibration sensing optical fiber sensor and a vibration sensing method that can capture variations in birefringence that accompany vibrations of an optical fiber, without depending on the state of polarization of the propagated light that propagates through the optical fiber.

In order to achieve the above-described object, a vibration sensing optical fiber sensor of this invention is structured to include a probe light supplying section, an optical fiber, a polarimeter for reflected light, and a computing unit.

The probe light supplying section generates, as probe light, light pulses that are switched alternately and periodically to orthogonal polarization directions. The probe light is inputted to the optical fiber. The polarimeter for reflected light measures the state of polarization of the reflected light that is the probe light that has been reflected by the optical fiber. The computing unit carries out specifying of the position of vibrations by using the state of polarization measured by the polarimeter for reflected light.

Further, in accordance with a preferred embodiment of the vibration sensing optical fiber sensor of this invention, a polarimeter for transmitted light is further included. The polarimeter for transmitted light measures the state of polarization of the transmitted light that is the probe light that has been transmitted through the optical fiber. The computing unit carries out sensing of the absence/presence of vibrations by using the state of polarization measured by the polarimeter for transmitted light.

A vibration sensing method of this invention is structured to include the following steps. Light pulses, which are switched alternately and periodically to orthogonal polarization directions, are generated as probe light. The probe light is inputted to an optical fiber. The state of polarization of reflected light, which is the probe light that has been reflected by the optical fiber, is measured. Specifying of the position of vibrations is carried out by using the measured state of polarization of the reflected light.

Further, in accordance with a preferred embodiment of the vibration sensing method of the invention, a step of measuring the state of polarization of transmitted light, which is the probe light that has been transmitted through the optical fiber, is further carried out. Sensing of the absence/presence of vibrations is carried out by using the state of polarization of the transmitted light.

In accordance with the vibration sensing optical fiber sensor and the vibration sensing method of this invention, by using light pulses, which are switched alternately and periodically to orthogonal polarization directions, as probe light, the Differential Angular Velocity (DAV) that is determined from the eigenvalue of the variations over time in the birefringence is utilized. Therefore, vibration sensing that does not depend on the state of polarization of incident light is possible. Further, the position of the vibrations can be specified from the DAV of the reflected light.

Moreover, if the DAV of the transmitted light is used, the absence/presence of vibrations can be sensed with good sensitivity.

DETAILED DESCRIPTION

Embodiments of the present invention are described hereinafter with reference to the drawings. The shapes, sizes and positional relationships of the respective structural elements are merely schematically illustrative to the extent of enabling comprehension of the invention, and are merely preferred examples. Accordingly, the invention is not to be limited to the embodiments described hereinafter, and numerous changes and modifications that can achieve the effects of the invention can be made without departing from the scope of the structure of the invention.

Further, vector quantities are used in the description of the specification, but there are cases in which the rightward-pointing arrows above the symbols expressing the vector quantities are omitted to the extent of not causing confusion.

(Vibration Sensing Optical Fiber Sensor)

Figure 1:
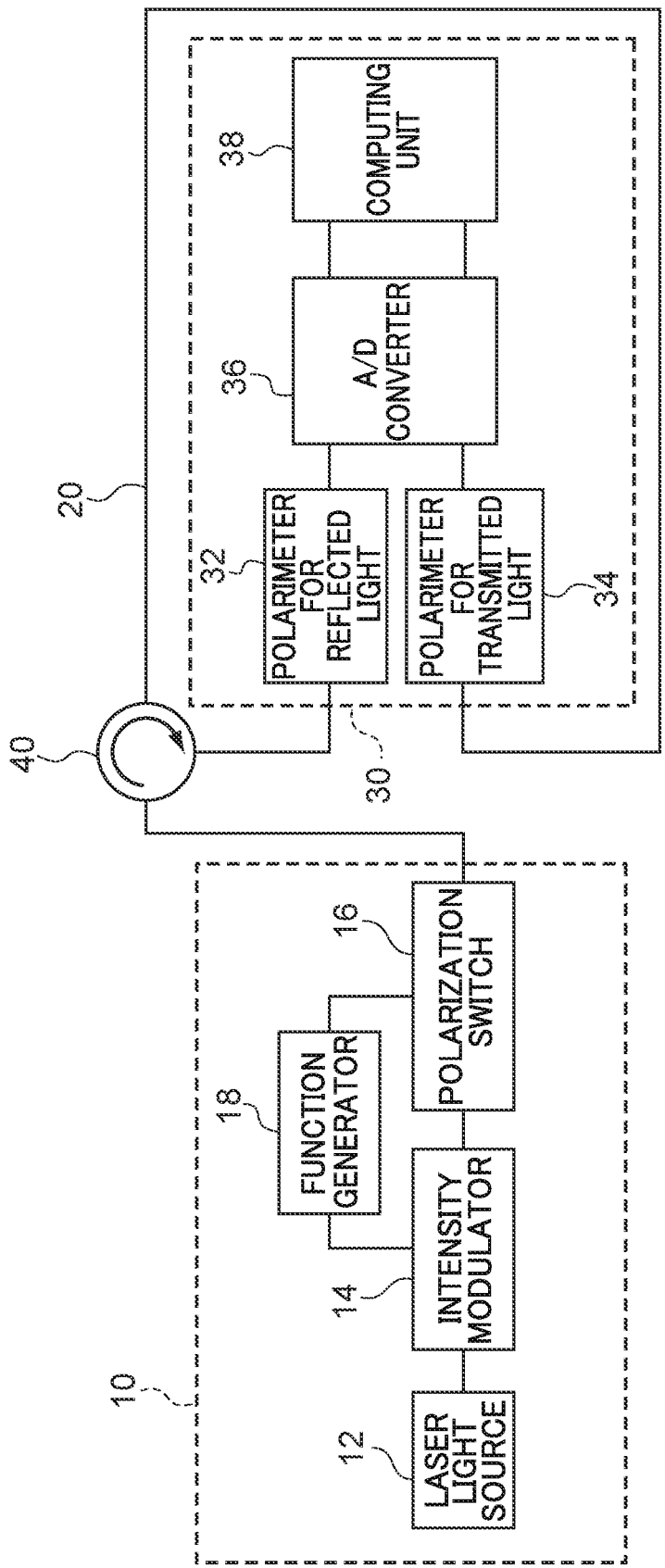
FIG. 1 is a block structural drawing showing the schematic structure of a vibration sensing optical fiber sensor.

An embodiment of the vibration sensing optical fiber sensor is described with reference to FIG. 1. FIG. 1 is a block structural drawing showing the schematic structure of the vibration sensing optical fiber sensor. This vibration sensing optical fiber sensor is structured to include a probe light supplying section 10, an optical fiber 20, a light circulator 40, and a state of polarization measuring section 30.

The probe light supplying section 10 generates, as probe light, light pulses that are switched periodically and alternately to orthogonal polarization directions. This probe light supplying section 10 is structured to include, for example, a laser light source 12, an intensity modulator 14, a polarization switch 16, and a function generator 18.

The function generator 18 generates rectangular electric pulses. The electric pulses are sent to the intensity modulator 14 and the polarization switch 16. The electric pulses, which are generated by the function generator 18 and supplied to the intensity modulator 14, have, for example, a width of 100 nsec and a repetition frequency of 10 kHz (a period of 100 μsec).

Further, the repetition frequency of the electric pulses, which are generated by the function generator 18 and supplied to the polarization switch 16, is made to be a repetition frequency that is half of that of the electric pulses that are supplied to the intensity modulator 14. For example, in a case in which the repetition frequency of the electric pulses supplied to the intensity modulator 14 is 10 kHz, the repetition frequency of the electric pulses supplied to the polarization switch 16 is 5 kHz.

The laser light source 12 generates continuous (CW) light. This CW light is sent to the intensity modulator 14.

The intensity modulator 14 generates light pulses by making the CW light into light pulses by electric pulses. These light pulses are sent to the polarization switch 16. The light pulses generated by the intensity modulator 14 have a width of 100 nsec and a repetition frequency of 10 kHz (a period of 100 μsec), which is the same as those of the electric pulses generated by the function generator 18.

The polarization switch 16 periodically and alternately switches the polarization directions of the light pulses to directions that are orthogonal to one another, at the period of the electric pulses.

For example, the peak-to-peak voltage Vpp of the electric pulses, which are supplied from the function generator 18 to the polarization switch 16, is half of applied voltage Vπ at which the phase difference between the orthogonal polarization axes of the light waves outputted from the polarization switch 16 becomes π (Vpp=Vπ/2). If electric pulses that satisfy this condition are supplied and the polarization switch 16 is driven, the light pulses outputted from the polarization switch 16 become switched-polarization light whose state of polarization is switched temporally between states of polarization that are orthogonal to one another.

Due thereto, switched-polarization light, which is light pulses whose state of polarization is, together with the passage of time, switched alternately between two states of polarization that are orthogonal to one another, is outputted from the polarization switch 16. In this example, the repetition frequency of the switched-polarization light is 5 kHz (a period of 200 μsec).

Generally, the frequency of mechanical vibrations that are transmitted to an optical fiber is less than 100 Hz. In this example, switched-polarization light of 5 kHz is generated at the polarization switch 16. Because the frequency of this switched-polarization light is sufficiently large as compared with the frequency of mechanical vibrations that are transmitted to the optical fiber, it can be considered that light pulses of two different states of polarization are inputted to the optical fiber at a substantially equivalent time with respect to the mechanical vibrations.

It is preferable to use a polarized wave modulator that utilizes lithium niobate for example as the polarization switch 16. However, a device can be utilized provided that it can, together with the passage of time, switch the state of polarization alternately between two states of polarization that are orthogonal to one another. For example, a polarized wave rotator that utilizes an electro-optical effect, a polarized wave rotator that uses a magneto-optical effect, or a ½ wave plate that is mechanically driven can also be used.

Note that, here, a case in which the state of polarization is, together with the passage of time, switched alternately between two states of polarization that are orthogonal to one another is described. However, it suffices for the two states of polarization to be states of polarization that differ from one another, and they do not necessarily have to be orthogonal.

The switched-polarization light that is generated by the polarization switch 16 is sent via the light circulator 40 to the optical fiber 20.

The probe light that is sent to the optical fiber 20 is propagated through the optical fiber 20, and is sent as transmitted light to the state of polarization measuring section 30. Further, some of the probe light sent to the optical fiber 20 is reflected by the optical fiber 20, and is sent as reflected light to the state of polarization measuring section 30.

The state of polarization measuring section 30 is structured to include a polarimeter 32 for reflected light, a polarimeter 34 for transmitted light, an analog-digital (A/D) converter 36 and a computing unit 38.

The polarimeter 32 for reflected light acquires the Stokes parameter of the reflected light sent to the state of polarization measuring section 30. The Stokes parameter of the reflected light is sent to the A/D converter 36.

The polarimeter 34 for transmitted light acquires the Stokes parameter of the transmitted light sent to the state of polarization measuring section 30. The Stokes parameter of the transmitted light is sent to the A/D converter 36.

It suffices for the polarimeter 32 for reflected light and the polarimeter 34 for transmitted light to be able to observe the time dependencies of the Stokes parameters. It suffices for the measurement velocity bands thereof to satisfy the sampling theorem with respect to the polarization fluctuation velocities of the time dependencies of the Stokes vectors of the optical fiber 20.

The A/D converter 36 converts the Stokes parameters, which have been acquired as analog signals, into digital signals.

Here, it suffices for the sampling frequency of the A/D converter 36 to be a frequency that satisfies the sampling theorem with respect to the electric pulses generated at the function generator 18. The sampling theorem is a theorem that quantitatively expresses at about what interval sampling should be carried out at the time of converting the analog signals into digital signals. Here, because the pulse width of the electric pulses generated at the function generator 18 is made to be 100 nsec, it suffices to utilize a sampling frequency of around 40 MS/sec (Mega Sampling/second) for example.

The digital signals obtained by conversion at the A/D converter 36 are sent to the computing unit 38.

The computing unit 38 computes the DAV by using the Stokes parameters that have been converted into digital signals. The computing unit 38 senses the absence/presence of abnormal vibrations by using the DAV computed from the Stokes parameter of the transmitted light. Further, in a case in which abnormal vibrations are sensed, the computing unit 38 specifies the position of the vibrations by using the DAV computed from the Stokes parameter of the reflected light. For example, a commercially-available personal computer (PC) including a processing circuitry and a memory, in which is installed software that is executed by the processing circuitry to carry out computing of the DAV and specifying of the position of the vibrations, can be utilized as the computing unit 38.

(Method of Computing DAV)

The method of computing the DAV is described.

The time development of the state of polarization of the light waves outputted from the optical fiber is given by following formula (1) (refer to, for example, Y. Kanda and H. Murai, "Novel extraction method of the maximum variation-rate of State-of-Polarization vector from time-varying birefringence", OFC2016, W2A.21 (Non-Patent Document 2)).

[Formula 1]

$$\frac{d}{dt}\vec{s}_{out}(t) = \vec{\omega}_b \times \vec{s}_{out}(t) \tag{1}$$

Here, $s_{out}(t)$ is the 3×1 Stokes vector that expresses the state of polarization of the light waves outputted from the optical fiber at time t, with respect to an arbitrary light wave that is inputted to the optical fiber. Here, t is the time that is defined at the output end of the optical fiber.

Angular velocity vector $\omega_b$ is a characteristic that is intrinsic to the optical fiber and that reflects variations over time in the birefringence, and is the 3×1 real vector that provides rotation around the direction of the angular velocity vector $\omega_b$ to the Stokes vector $s_{out}(t)$ within time width dt that is very small. On the other hand, the state of polarization $s_{out}(t)$ of the light waves outputted from the optical fiber depends on the state of polarization of the light waves inputted to the optical fiber. Here, the tip of the Stokes vector that expresses this state of polarization depends on the state of polarization of the light incident on the optical fiber, and can pass through any point on the Poincaré sphere.

Here, the important point is that the angular velocity vector $\omega_b$ expresses variations over time in the birefringence that is intrinsic to the optical fiber, and does not depend on the state of polarization of the inputted light waves. Namely, the state of polarization $s_{out}(t)$ of the light waves outputted from the optical fiber depend on the state of polarization of the light waves inputted to the optical fiber, and, in contrast, the angular velocity vector $\omega_b$ does not depend on the state of polarization of the inputted light waves. Therefore, if the angular velocity vector $\omega_b$ is measured, variations over time in the birefringence that is intrinsic to the optical fiber, i.e., the characteristic of the optical fiber relating to vibrations, can be known without depending on the state of polarization of the inputted light waves.

The length of the angular velocity vector $\omega_b$ is DAV which is the difference in two eigenvalues of the time development operator that is defined by the time portion in the Jones matrix of the optical fiber.

The angular velocity vector $\omega_b$ is determined by measuring the 3-row×3-column rotation matrix R(t) that expresses the birefringence of the optical fiber. Here, it is assumed that the state of polarization of the light waves inputted to the optical fiber does not fluctuate.

Given that the Stokes vector of the light waves inputted to the optical fiber is $s_{in}(t)$, the relationship between the Stokes vectors $s_{in}(t)$ and $s_{out}(t)$ and the rotation matrix R(t) is given by following formula (2).

[Formula 2]

$$\vec{s}_{out}(t) = R^\dagger(t)\vec{s}_{in}(t) \qquad (2)$$

The first-order time derivative of above formula (2) is given by following formula (3).

[Formula 3]

$$\frac{d}{dt}\vec{s}_{out}(t) = \left\{\frac{d}{dt}R(t)\right\}\vec{s}_{in}(t) \qquad (3)$$

Following formula (4) is obtained from above formulas (2) and (3).

[Formula 4]

$$\vec{s}_{in}(t) = R^\dagger(t)\vec{s}_{out}(t) \qquad (4)$$

Here, † means the adjoint operator. If above formula (4) is substituted into the right side of above formula (3), following formula (5) is obtained.

[Formula 5]

$$\frac{d}{dt}\vec{s}_{out}(t) = \left\{\frac{d}{dt}R(t)\right\}R^\dagger(t)\vec{s}_{out}(t) \qquad (5)$$

Comparing above formula (1) and above formula (5), the expression "$\omega_b \times$" of the outer product operator of the angular velocity vector is given by following formula (6).

[Formula 6]

$$\vec{\omega}_b \times = \left\{\frac{d}{dt}R(t)\right\}R^\dagger(t) \qquad (6)$$

Moreover, when the expression "$\omega_b \times$" of the outer product operator of the angular velocity vector is expressed as a matrix, following formula (7) is obtained.

[Formula 7]

$$\vec{\omega}_b \times = \begin{bmatrix} 0 & -\omega_{b3} & \omega_{b2} \\ \omega_{b3} & 0 & -\omega_{b1} \\ -\omega_{b2} & \omega_{b1} & 0 \end{bmatrix} \qquad (7)$$

Here, the angular velocity vector $\omega_b$ is a 3-row×1-column column vector, and is expressed by following formula (8).

[Formula 8]

$$\vec{\omega}_b = \begin{bmatrix} \omega_{b1} \\ \omega_{b2} \\ \omega_{b3} \end{bmatrix} \qquad (8)$$

As described above, if the variations over time in the rotation matrix R(t) are measured, the angular velocity vector $\omega_b$ is determined from above formula (6) and above formula (7). Further, the absolute value $|\omega_b|$ that provides the magnitude of the angular velocity vector $\omega_b$ coincides with the angular velocity (rad/sec) of the circle that the tip of the Stokes vector $s_{out}(t)$ of the outputted light waves plots on the Poincaré sphere together with the passage of time.

The position of the lead end of the Stokes vector $s_{out}(t)$ of the outputted light waves differs in accordance with the state of polarization of the light waves that are inputted to the optical fiber. Therefore, the radius of the circle that $s_{out}(t)$ plots on the Poincaré sphere also depends on the state of polarization of the inputted light waves. However, the angular velocity of the circle plotted by the lead end of $s_{out}(t)$ does not depend on the state of polarization of the inputted light waves, regardless of the radius of the circle. In this way, if the angular velocity vector $\omega_b$, which provides the particular state of the birefringence inherent in the optical fiber itself, is measured, variations over time in the birefringence of the optical fiber can be quantified without depending on the state of polarization of the inputted light waves.

In the measurement of the rotation matrix R(t) at time t at which the light waves are outputted from the optical fiber, the rotation matrix R(t) can be determined from the states of polarization of the respective measured light waves, for the two states of polarization that are orthogonal to one another. However, for the time-varying rotation matrix R(t), there is one state of polarization that can be defined instantaneously. However, within a short time interval that is of an extent that the rotation matrix R(t) can be considered to be steady, if the state of polarization of the inputted light waves is switched to two states of polarization, and the state of polarization of the outputted light waves is divided in two at half of the period of the electric pulses supplied to the polarization switch, it can be considered that, for the two states of polarization that are orthogonal to one another, the states of polarization of the light waves are measured about simultaneously.

Generally, the frequency of mechanical vibrations that are transmitted to an optical fiber is less than 100 Hz, i.e., has a period that is greater than or equal to 10 msec. In this example, the period of the switched-polarization light is 200 μsec. Accordingly, it can be considered that, at about the same time t for the two states of polarization that are orthogonal to one another, the state of polarization of the light waves outputted from the optical fiber is measured, and the rotation matrix R(t) is determined. Here, the respective $t_1$, $t_a$ of the Stokes vectors that are taken-out every 200 μsec are expressed by following formula (9) when expressed by vector components.

[Formula 9]

$$t_1 = \begin{bmatrix} t_{11} \\ t_{12} \\ t_{13} \end{bmatrix}, t_a = \begin{bmatrix} t_{a1} \\ t_{a2} \\ t_{a3} \end{bmatrix} \quad (9)$$

Further, the two Stokes vectors $t_2$, $t_3$ expressed by following formula (10) are newly defined.

[Formula 10]

$$t_3 = t_1 \times t_a = \begin{bmatrix} t_{31} \\ t_{32} \\ t_{33} \end{bmatrix}, t_2 = t_3 \times t_1 = \begin{bmatrix} t_{21} \\ t_{22} \\ t_{23} \end{bmatrix} \quad (10)$$

Note that the Stokes vectors $t_1$, $t_a$, $t_2$ and $t_3$ are normalized such that the absolute values of all are 1.

The rotation matrix R(t) is expressed by following formulas (11) and (12) by using the Stokes vectors $t_1$, $t_2$ and $t_3$ (refer to, for example, R. M. Jopson, L. E. Nelson, and H. Kogelnik, "Measurement of Second-Order Polarization-Mode Dispersion Vectors in Optical Fibers", IEEE Photonics Technology Letters, vol. 11, No. 9, (1999), pp. 1153-1155 (Non-Patent Document 3)).

[Formula 11]

$$R^\dagger = \begin{bmatrix} t_{11} & t_{12} & t_{13} \\ t_{21} & t_{22} & t_{23} \\ t_{31} & t_{32} & t_{33} \end{bmatrix} \quad (11)$$

[Formula 12]

$$R = \begin{bmatrix} t_{11} & t_{21} & t_{31} \\ t_{12} & t_{22} & t_{32} \\ t_{13} & t_{23} & t_{33} \end{bmatrix} \quad (12)$$

If variations over time of this rotation matrix R(t) are determined from variations over time of the Stokes vectors $t_1$ and $t_a$, the variations over time in the angular velocity vector $\omega_b$ with respect to the passage of time can be determined from above formulas (6) and (7). Further, if the angular velocity vector $\omega_b$ is determined, the DAV is easily determined as the length of the angular velocity vector $\omega_b$.

(Sensing of Vibrations)

Figure 2:
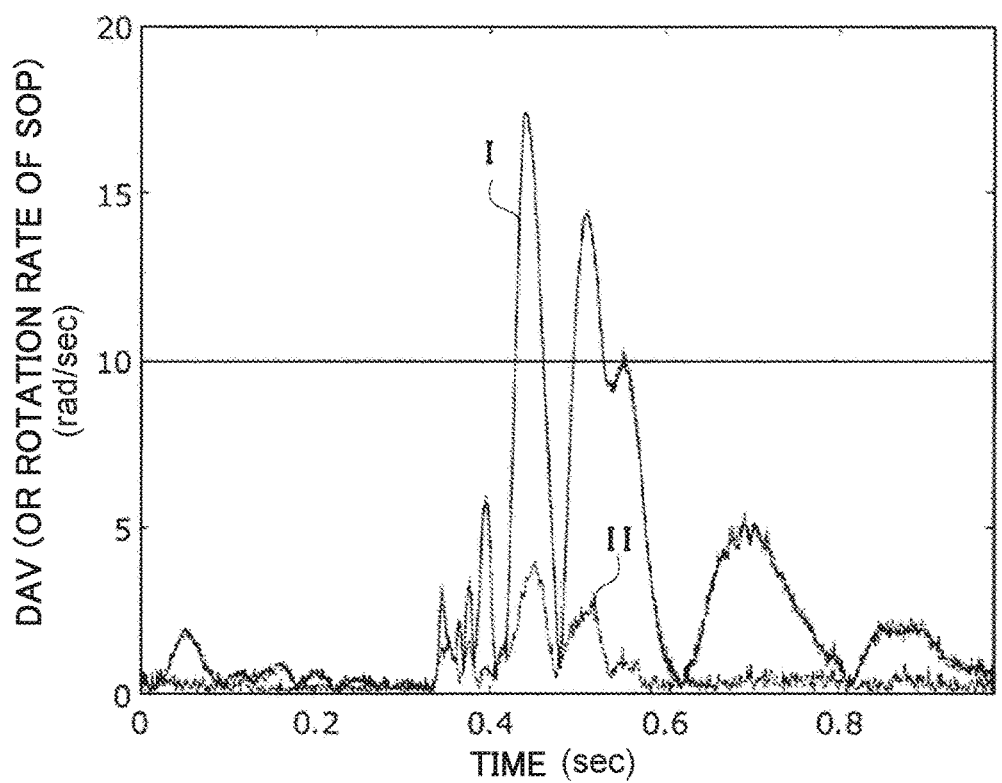
FIG. 2 is a drawing showing an example of measuring the DAV relating to vibrations by utilizing transmitted light.

FIG. 2 is a drawing showing an example of measuring the DAV relating to vibrations by using transmitted light. In FIG. 2, time is plotted on the horizontal axis, and the DAV or the rotation rate of the SOP is plotted on the vertical axis. In FIG. 2, curve I represents the DAV. Further, curve II represents the state of polarization (SOP) used in a conventional optical fiber sensor, i.e., the rotation rate of the Stokes vector.

The rotation rate of the Stokes vector depends on the state of polarization of the incident light. In contrast, the DAV that is used in this invention does not depend on the state of polarization of the incident light, and corresponds to the maximum value of the rotation rate of the Stokes vector.

Accordingly, in accordance with this invention, vibration sensing that does not depend on the state of polarization of the incident light is possible.

Further, generally, the light intensity of the reflected light of the optical fiber is extremely weak. Therefore, differentiating from disturbances such as wind and the like is difficult by using only reflected light, and this becomes a factor of erroneous sensing. Accordingly, vibrations can be sensed with good sensitivity by measuring the DAV of the transmitted light.

Note that in a case in which vibrations can be sensed sufficiently by the DAV of the reflected light, measurement of the DAV of the transmitted light does not have to be carried out.

Figure 3A:
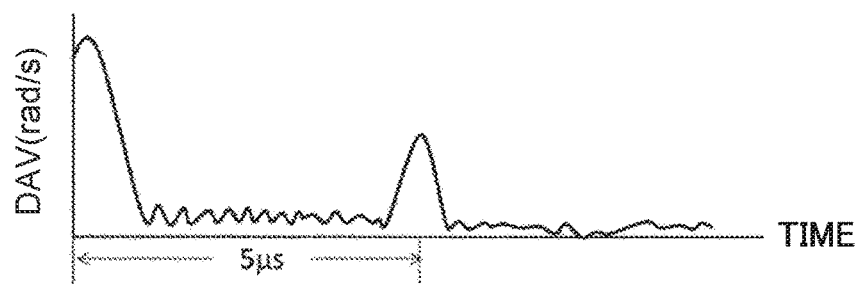
FIGS. 3A and 3B are schematic drawings for explaining a method of specifying a position of vibrations by utilizing reflected light.
Figure 3B:
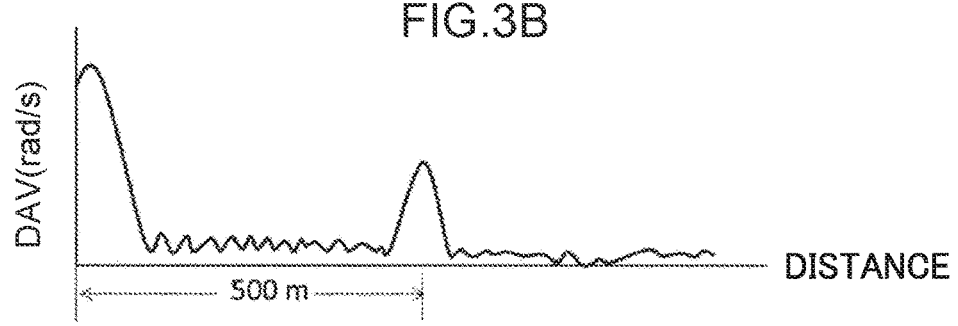

A method of specifying the position of vibrations by using reflected light is described with reference to FIGS. 3A and 3B. FIGS. 3A and 3B are schematic drawings for explaining a method of specifying the position of vibrations by using reflected light.

In FIG. 3A, time is plotted on the horizontal axis, and the DAV of the reflected light is plotted on the vertical axis. Further, in FIG. 3B, distance is plotted on the horizontal axis, and the DAV of the reflected light is plotted on the vertical axis.

The DAV of the reflected light can be determined by a method similar to that of determining the DAV of the transmitted light.

Light pulses propagate within the optical fiber with a delay of 5 nsec/m. Reflected light is generated accompanying the propagation of the light pulses. The reflected light propagates in the direction opposite to the inputted light pulses, with a same delay of 5 nsec/m. For example, a case can be considered in which vibrations are inputted at a place of 500 m from the input end. In the present invention, the Stokes parameter of the reflected light is measured with respect to the light pulses whose polarization is switched. Therefore, if the DAV is determined at each time that the reflected light arrives, fluctuations in the DAV are seen at a time position of 5 μsec that is the propagation delay time until the light pulses reach the place of the vibrations and return to the input end as reflected light (FIG. 3A).

If this propagation delay time is converted into distance, the distance from the place of the vibrations to the input end can be specified (FIG. 3B).

What is claimed is:

1. A vibration sensing optical fiber sensor comprising:
a probe light source that generates, as probe light, light pulses that are switched alternately and periodically to orthogonal polarization directions;
an optical fiber into which the probe light is input;
a first polarimeter that measures a state of polarization of reflected light, which is the probe light that has been reflected by the optical fiber; and
a processing circuitry that specifies a position of vibrations by using a differential angular velocity (DAV) from the state of polarization measured by the first polarimeter.

2. The vibration sensing optical fiber sensor of claim 1, further comprising:
a second polarimeter that measures a state of polarization of transmitted light, which is the probe light that has been transmitted through the optical fiber,
wherein the processing circuitry detects absence/presence of vibrations by using the DAV calculated the state of polarization measured by the second polarimeter.

3. The vibration sensing optical fiber sensor of claim 2, further comprising a light circulator that sends the probe light generated by the probe light source to the optical fiber, and sends the reflected light reflected by the optical fiber to the first polarimeter.

4. The vibration sensing optical fiber sensor of claim 1, further comprising a light circulator that sends the probe light generated by the probe light source to the optical fiber, and sends the reflected light reflected by the optical fiber to the first polarimeter.

5. The vibration sensing optical fiber sensor of claim 1, wherein the probe light source comprises:
- a laser light source that generates continuous light;
- an intensity modulator that changes the continuous light into light pulses; and
- a polarization switch that switches a polarization direction of the light pulses alternately and periodically to orthogonal polarization directions.

6. The vibration sensing optical fiber sensor of claim 2, wherein the probe light source comprises:
- a laser light source that generates continuous light;
- an intensity modulator that changes the continuous light into light pulses; and
- a polarization switch that switches a polarization direction of the light pulses alternately and periodically to orthogonal polarization directions.

7. The vibration sensing optical fiber sensor of claim 3, wherein the probe light source comprises:
- a laser light source that generates continuous light;
- an intensity modulator that changes the continuous light into light pulses; and
- a polarization switch that switches a polarization direction of the light pulses alternately and periodically to orthogonal polarization directions.

8. The vibration sensing optical fiber sensor of claim 4, wherein the probe light source comprises:
- a laser light source that generates continuous light;
- an intensity modulator that changes the continuous light into light pulses; and
- a polarization switch that switches a polarization direction of the light pulses alternately and periodically to orthogonal polarization directions.

9. A vibration sensing method comprising:
- generating, by a probe light source, as probe light, light pulses that are switched alternately and periodically to orthogonal polarization directions;
- inputting the probe light to an optical fiber;
- measuring, by a first polarimeter, a state of polarization of reflected light, which is the probe light that has been reflected by the optical fiber; and
- carrying out, by a processing circuitry, specification of a position of vibrations by using a differential angular velocity (DAV) from the measured state of polarization of the reflected light.

10. The vibration sensing method of claim 9, wherein the method further comprises:
- measuring, by a second polarimeter, a state of polarization of transmitted light, which is the probe light that has been transmitted through the optical fiber, and
- detecting a presence or absence of vibrations by using the DAV from the state of polarization of the transmitted light.

* * * * *